(12) United States Patent
Hattori et al.

(10) Patent No.: US 12,332,500 B2
(45) Date of Patent: Jun. 17, 2025

(54) LOCKING DEVICE, GIMBAL MECHANISM, AND TELESCOPE DEVICE

(71) Applicant: Mitsubishi Electric Corporation, Tokyo (JP)

(72) Inventors: Tomoya Hattori, Tokyo (JP); Noboru Kawaguchi, Tokyo (JP); Atsumu Oikawa, Tokyo (JP); Koichi Takeda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/850,059

(22) PCT Filed: Mar. 29, 2023

(86) PCT No.: PCT/JP2023/012907
§ 371 (c)(1),
(2) Date: Sep. 24, 2024

(87) PCT Pub. No.: WO2023/190731
PCT Pub. Date: Oct. 5, 2023

(65) Prior Publication Data
US 2025/0164741 A1 May 22, 2025

(30) Foreign Application Priority Data
Mar. 30, 2022 (JP) .................. 2022-055552

(51) Int. Cl.
*G02B 7/183* (2021.01)
*G02B 23/02* (2006.01)
(52) U.S. Cl.
CPC ............. *G02B 7/183* (2013.01); *G02B 23/02* (2013.01)

(58) Field of Classification Search
CPC ...... G02B 7/1821; G02B 7/183; G02B 7/198; G02B 23/02
(Continued)

(56) References Cited

U.S. PATENT DOCUMENTS 4,023,891 A * 5/1977 Chadwick ............ G02B 7/1821
359/874
7,009,752 B1 * 3/2006 Lorell .................. G02B 7/1821
359/290

(Continued)

FOREIGN PATENT DOCUMENTS

| JP | S60-062205 A | 4/1985 |
| JP | S63-305209 A | 12/1988 |
| JP | H07-307703 A | 11/1995 |

OTHER PUBLICATIONS

International Search Report and Written Opinion mailed on Jun. 13, 2023, received for PCT Application PCT/JP2023/012907, filed on Mar. 29, 2023, 8 pages including English Translation.
(Continued)

*Primary Examiner* — Ricky D Shafer
(74) *Attorney, Agent, or Firm* — XSENSUS LLP

(57) ABSTRACT

Provided are a driven object side presser to press the first holder from a side where the driven object exists, a force transmitter to convert a tensile force to a pressing force with which the driven object side presser presses the first holder and to transmit the pressing force to the driven object side presser, a fixed member side presser to press the first holder from a side where the fixed member exists, a support fixed to the fixed member, a link to be connected to the force transmitter rotatably, the support, and the fixed member side presser and to move the fixed member side presser in a direction approaching the first holder when the force transmitter is moved in a direction away from the first holder, and
(Continued)

a locking force generator to generate the tensile force, and to lock the first holder so as not to be moved.

20 Claims, 12 Drawing Sheets

(58) Field of Classification Search
USPC .......................................... 359/399, 872, 876
See application file for complete search history.

(56) References Cited

U.S. PATENT DOCUMENTS

| | | | |
|---|---|---|---|
| 8,752,969 B1* | 6/2014 | Kane | G01C 11/025 |
| | | | 359/872 |
| 2002/0143252 A1* | 10/2002 | Dunne | G10K 11/355 |
| | | | 600/437 |
| 2007/0008514 A1* | 1/2007 | Krasutsky | G01S 7/4817 |
| | | | 359/399 |
| 2010/0220390 A1* | 9/2010 | Wein | F41G 3/22 |
| | | | 359/872 |
| 2011/0038021 A1* | 2/2011 | Demers | G02B 7/1828 |
| | | | 359/198.1 |
| 2019/0126395 A1* | 5/2019 | Nakamura | B23K 26/082 |
| 2021/0141404 A1* | 5/2021 | Takahara | H02N 2/142 |

OTHER PUBLICATIONS

Decision to Grant a Patent mailed on Apr. 2, 2024, received for JP Application 2024-512709, 3 pages including English Translation.

* cited by examiner

LOCKING DEVICE, GIMBAL MECHANISM, AND TELESCOPE DEVICE

CROSS-REFERENCE TO RELATED APPLICATIONS

This application is a national stage application pursuant to 35 U.S.C. § 371, of International Patent Application No. PCT/JP2023/012907, filed Mar. 29, 2023, and claims the benefit of priority from Japanese Patent Application No. 2022-055552, filed Mar. 30, 2022, the entire contents of each are incorporated herein by reference.

TECHNICAL FIELD

The present disclosure relates to a locking device that locks a gimbal mechanism so that the gimbal mechanism is not movable and the gimbal mechanism and a telescope device including the locking device.

BACKGROUND ART

A satellite mounted with a telescope is launched in order to perform celestial observation in space not affected by the earth's atmosphere. For example, an artificial satellite mounted with a telescope for observing the sun is launched in order to observe a solar flare or the like generated on the surface of the sun. In the future, it is planned to launch an artificial satellite mounted with a telescope. A solar flare is an explosion that occurs on the surface of the sun. When the solar flare occurs, a flow such as electromagnetic waves and radiation of high-energy particles is generated, and the influence of the solar flare is observed on the earth.

The telescope includes a gimbal mechanism so that an orientation direction can be changed. The gimbal mechanism allows a movable member to be rotated around two rotation axes orthogonal each other with respect to a fixed member. When a satellite mounted with a telescope is launched, a severe impulsion is applied to the satellite. In order to prevent the telescope mounted on the satellite from being damaged, the telescope mounted on the satellite is required to be equipped with a locking device that locks the gimbal mechanism so as not to be moved.

The gimbal mechanism is a structure used for an optical part of an observation apparatus and often used for a similar device mounted on a satellite. The gimbal mechanism is used to change the orientation direction of antenna, observation apparatus, sensor, control moment gyroscope (CMG), and the like. In the gimbal mechanism, a target to make rotatable around two rotation axes is referred to as a driven object.

As a locking device, there is a locking device including first and second pressing members that press, from both sides, a first gimbal that fixes a driven object and a second gimbal fixed to a fixed member, a pressurizing unit that applies a pressurizing force in a direction in which the first gimbal and the second gimbal are separated from each other, a die rod that locks the first pressing member and the second pressing member, and a cutter that cuts the die rod (see PTL 1).

There is an antenna drive device mounted on an artificial satellite, the antenna drive device including an elastic body that pulls an antenna base in a direction to a fixed member fixed to the satellite, a lock mechanism that is disposed between the fixed member and the antenna base and prevents the antenna base from moving toward the fixed member, a support rod that has one end inserted into a positioning hole provided in the antenna base and supports the antenna base, and a linear actuator that is disposed between the support rod and the fixed member and whose length can be changed (see PTL 2).

CITATION LIST

Patent Literature

PTL 1: Japanese Patent Laid-Open No. S63-305209
PTL 2: Japanese Patent Laid-Open No. S60-62205

SUMMARY OF INVENTION

Technical Problem

The locking device described in PTL 1 has a complex structure. In a case where the driven object is a main mirror, it is presumed that an operation of removing the first pressing member from a mirror surface side of the main mirror is necessary after the lock between the first pressing member and the second pressing member is released.

In the locking device described in PTL 2, since a locking force is caused by the elastic body that also operates when the antenna is used, it is presumed that the locking force is not sufficient.

An object of the present disclosure is to obtain a locking device that can lock a gimbal mechanism with sufficient force and has a simpler structure than a conventional locking device and the gimbal mechanism including the locking device.

Solution to Problem

A locking device according to one aspect of the present disclosure is a locking device in a gimbal mechanism including a first holder to hold a driven object, a second holder to hold the first holder so as to be rotatable around a first rotation axis, and a fixed member to hold the second holder so as to be rotatable around a second rotation axis that exists on a plane on which the first rotation axis exists and is orthogonal to the first rotation axis, the locking device locking the first holder so as not to be moved with respect to the fixed member or making the first holder movable with respect to the fixed member.

The locking device includes a driven object side presser to press the first holder from a side where the driven object exists, a force transmitter having a portion penetrating the first holder and to convert a tensile force pulled toward a side where the fixed member exists to a pressing force with which the driven object side presser presses the first holder, and to transmit the pressing force to the driven object side presser, a fixed member side presser to press the first holder from the side where the fixed member exists, a support disposed between the force transmitter and the fixed member side presser when viewed from a vertical direction that is a direction perpendicular to the first rotation axis and the second rotation axis, the support being fixed to the fixed member, a link to be connected to the force transmitter rotatably, the support, and the fixed member side presser, to move the fixed member side presser in a direction approaching the first holder when the force transmitter is moved in a direction away from the first holder, and to move the fixed member side presser in a direction away from the first holder when the force transmitter is moved in a direction approaching the first holder, and a locking force generator to generate the tensile force, and to lock the first holder, sandwiched between the driven object side presser and the fixed member side presser, so as not to be moved with respect to the fixed member.

According to one aspect of the present disclosure, a gimbal mechanism includes a first holder to hold a driven object, a second holder to hold the first holder so as to be rotatable around a first rotation axis, a fixed member to hold the second holder so as to be rotatable around a second rotation axis that exists on a plane on which the first rotation axis exists and is orthogonal to the first rotation axis, and a locking device locking the first holder so as not to be moved with respect to the fixed member or making the first holder movable with respect to the fixed member.

The locking device includes a driven object side presser to press the first holder from a side where the driven object exists, a force transmitter having a portion penetrating the first holder and to convert a tensile force pulled toward a side where the fixed member exists to a pressing force with which the driven object side presser presses the first holder, and to transmit the pressing force to the driven object side presser, a fixed member side presser to press the first holder from the side where the fixed member exists, a support disposed between the force transmitter and the fixed member side presser when viewed from a vertical direction that is a direction perpendicular to the first rotation axis and the second rotation axis, the support being fixed to the fixed member, a link to be connected to the force transmitter rotatably, the support, and the fixed member side presser, to move the fixed member side presser in a direction approaching the first holder when the force transmitter is moved in a direction away from the first holder, and to move the fixed member side presser in a direction away from the first holder when the force transmitter is moved in a direction approaching the first holder, and a locking force generator to generate the tensile force, and to lock the first holder, sandwiched between the driven object side presser and the fixed member side presser, so as not to be moved with respect to the fixed member.

Advantageous Effects of Invention

In the present disclosure, it is possible to obtain a locking device that can lock a gimbal mechanism with sufficient force and has a simpler structure than a conventional locking device and the gimbal mechanism including the locking device.

DESCRIPTION OF EMBODIMENTS

First Embodiment

Figures 5, 6:
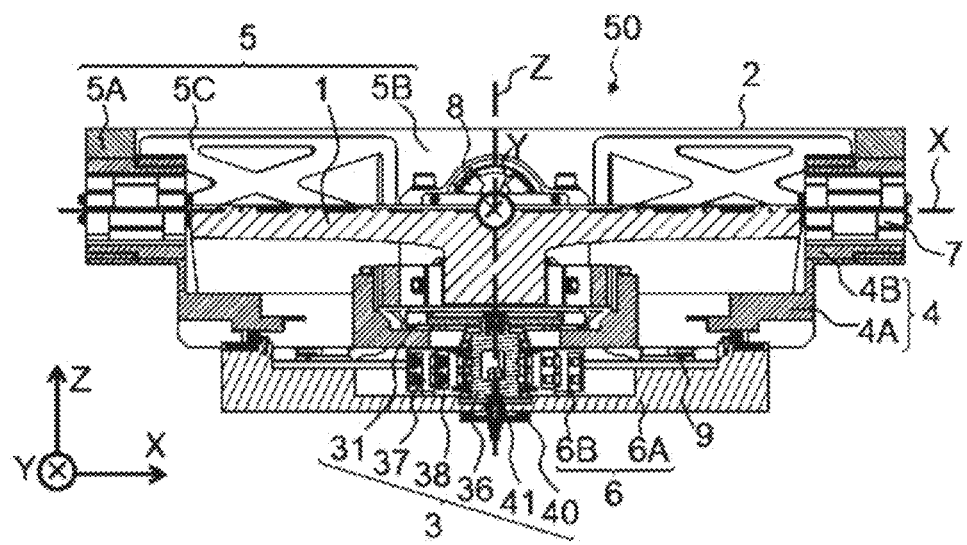
FIG. 5 is a sectional view of the telescope device including the locking device according to the first embodiment.
FIG. 6 is a perspective view of a main mirror tilt holder included in the telescope device including the locking device according to the first embodiment.
Figure 7:
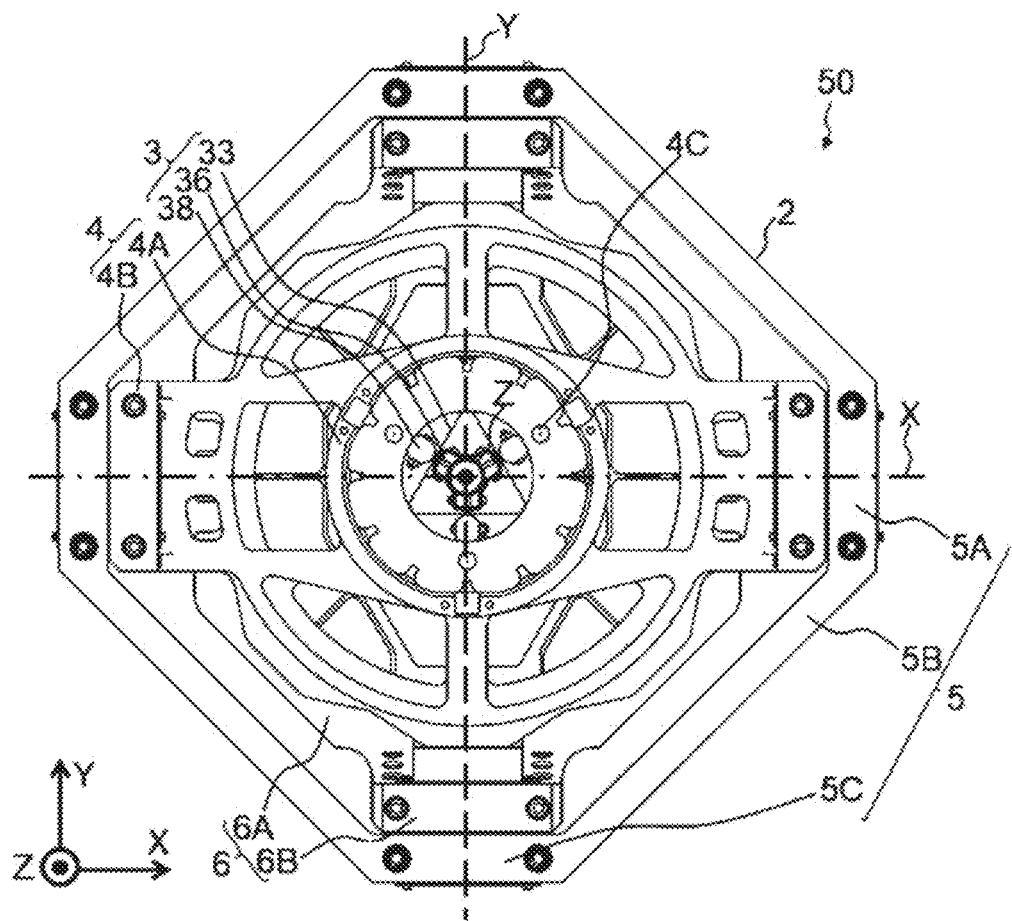
FIG. 7 is a plan view of the telescope device including the locking device according to the first embodiment in a state where a main mirror and an upper portion of the locking device are removed.
Figure 8:
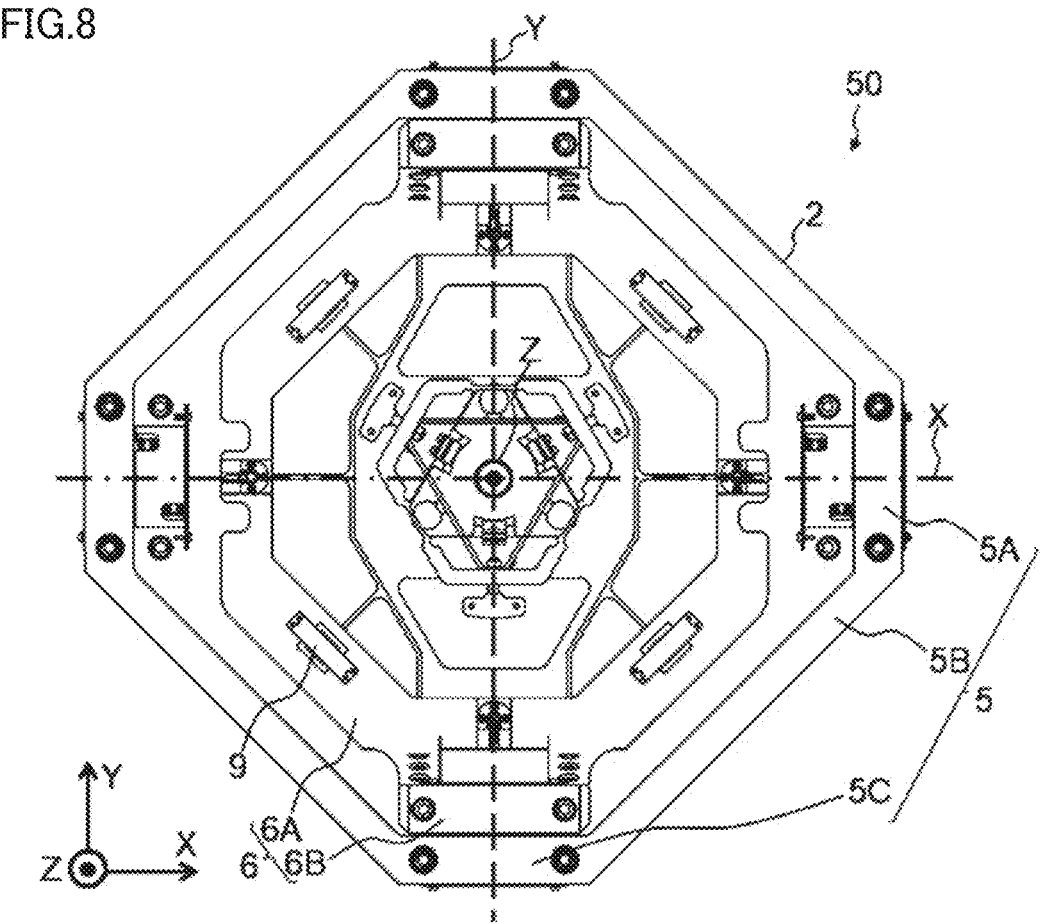
FIG. 8 is a plan view of the telescope device including the locking device according to the first embodiment in a state where the main mirror and an X axis member are removed.
Figure 9:
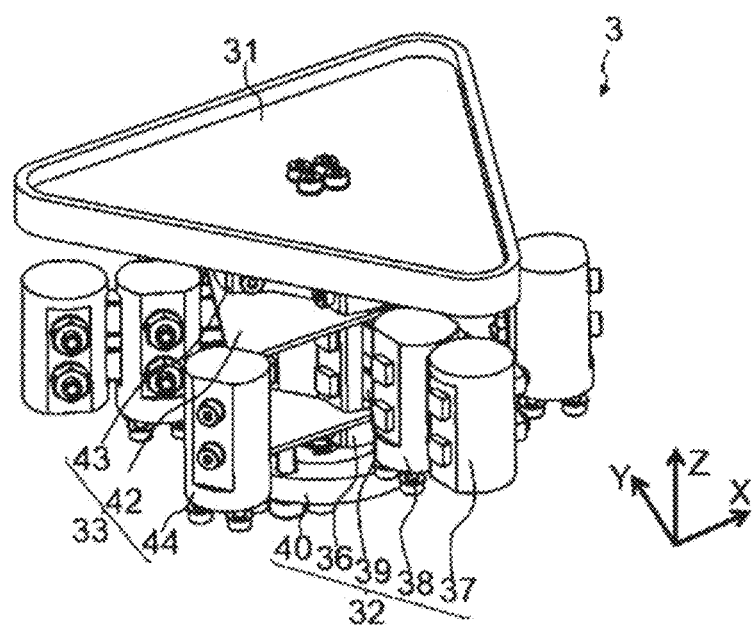
FIG. 9 is a perspective view of the locking device according to the first embodiment.

Referring to FIGS. 1 to 8, a structure of a telescope device including a locking device according to a first embodiment of the present disclosure is described. FIGS. 1 to 4 are a perspective view, a front view, a plan view, and a right side view of the telescope device, respectively. FIG. 5 is a sectional view of the telescope device taken along line A-A illustrated in FIG. 3. The A-A cross section is a cross section parallel to an XZ plane passing through a center of a main mirror 1. FIG. 6 is a perspective view of a main mirror tilt holder included in the telescope device. FIG. 7 is a plan view of the telescope device in a state where the main mirror and an upper portion of the locking device are removed. FIG. 8 is a plan view of the telescope device in a state where the main mirror and an X axis member are removed.

In order to describe a structure of a telescope device 50, an XYZ coordinate system is defined. A Z axis is an axis perpendicular to a plane of a structural object 70 (illustrated in FIG. 10) to which telescope device 50 is fixed. A plane perpendicular to the Z axis is referred to as horizontal plane for convenience's sake. The X axis and a Y axis are defined as two orthogonal axes on the horizontal plane. The X axis and the Y axis are defined so as to coincide with two rotation axes along which telescope device 50 changes an orientation direction. The Z axis passes through an intersection point of the X axis and the Y axis. An intersection point where the X axis, the Y axis, and the Z axis intersect each other orthogonally at one point is set as an origin of the XYZ coordinate system. In the Z axis, a direction away from structural object 70 is a positive direction of the Z axis. In telescope device 50, a side having a larger value of Z coordinate is referred to as upper side for convenience's sake, and a side having a smaller value of Z coordinate is referred to as lower side.

Figure 1:
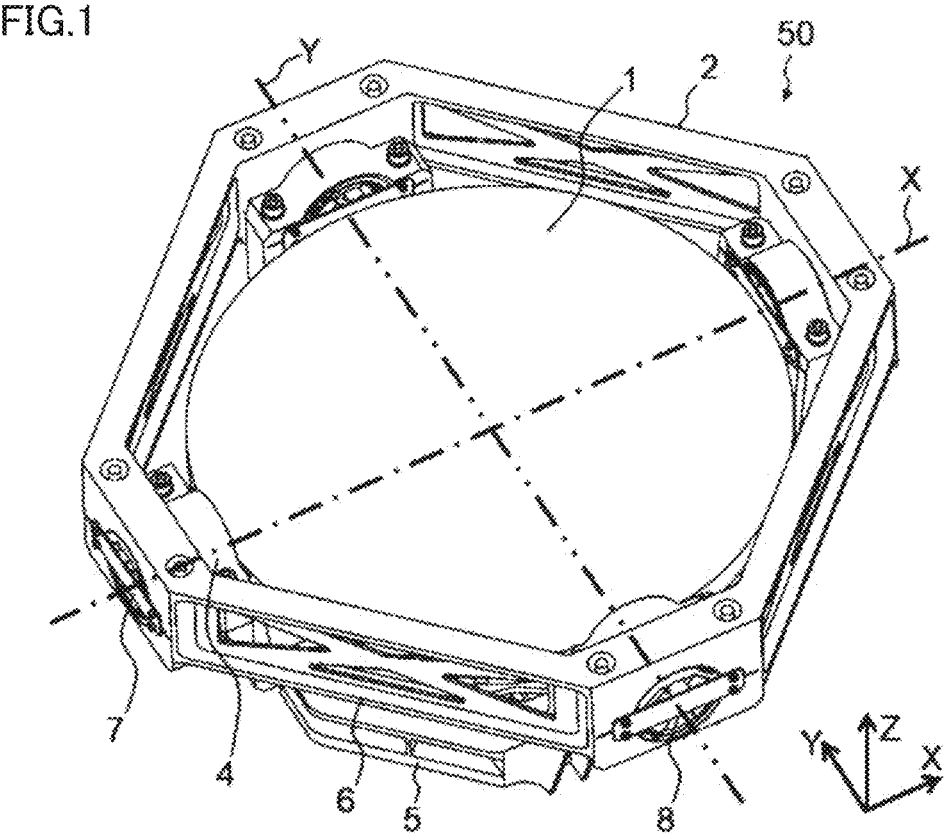
FIG. 1 is a perspective view of a telescope device including a locking device according to a first embodiment.
Figure 2:
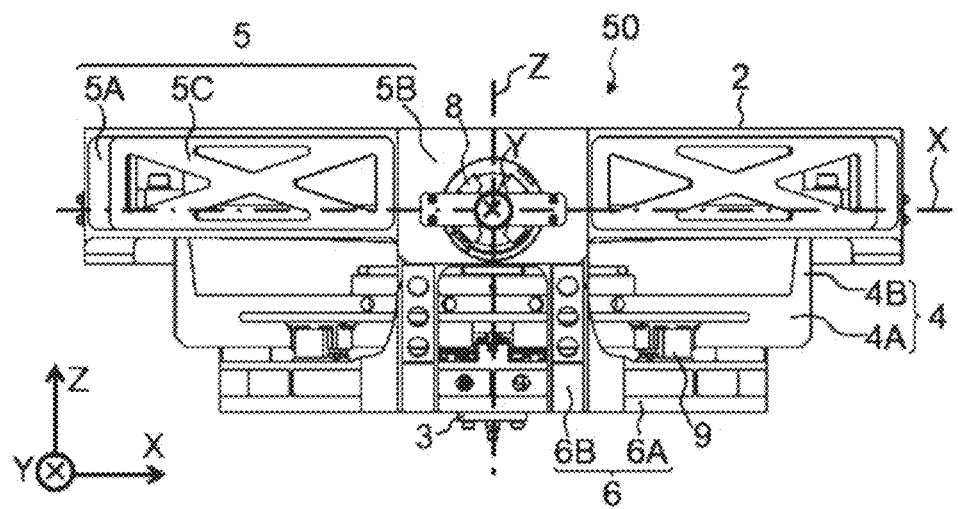
FIG. 2 is a front view of the telescope device including the locking device according to the first embodiment.
Figure 3:
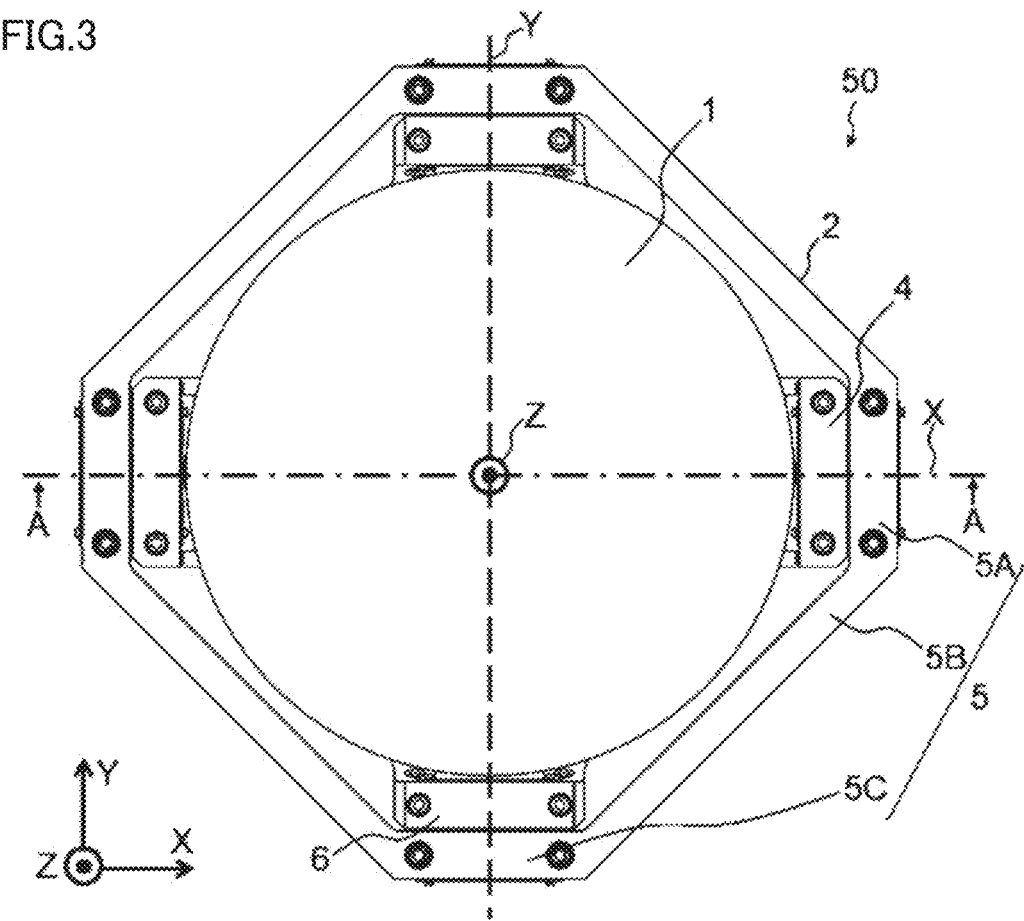
FIG. 3 is a plan view of the telescope device including the locking device according to the first embodiment.
Figure 4:
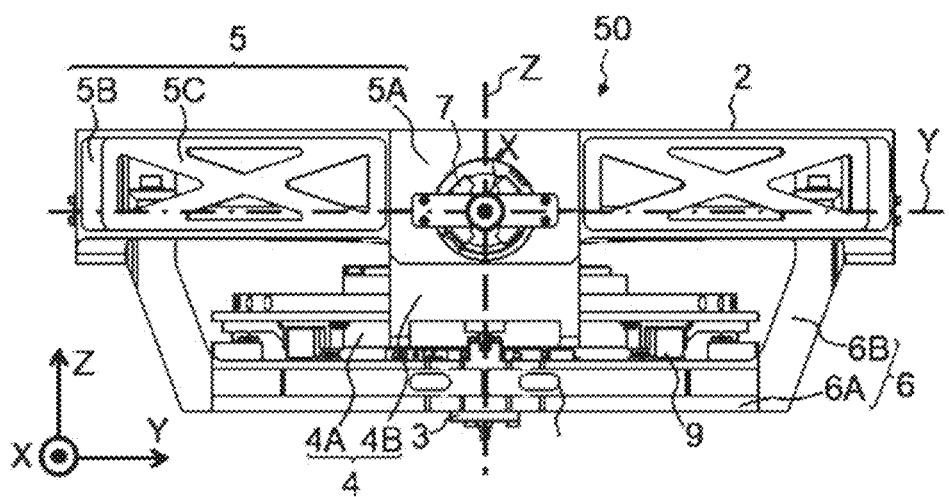
FIG. 4 is a right side view of the telescope device including the locking device according to the first embodiment.

Telescope device 50 is a telescope mounted on an artificial satellite. Telescope device 50 includes main mirror 1, a main mirror tilt holder 2, and a locking device 3. Main mirror 1 is, for example, a concave mirror having a diameter of about 300 mm. Main mirror 1 reflects observation light. Main mirror tilt holder 2 holds main mirror 1 so as to be rotatable around the X axis and the Y axis. The X axis and the Y axis are rotation axes that exist on a plane and are orthogonal to each other. In FIG. 1 and the like, the X axis is indicated by a one-dot chain line, and the Y axis is indicated by a two-dot chain line. The Z axis is indicated by a long broken line. Locking device 3 is a device that can lock main mirror tilt holder 2 so as not to be moved with respect to structural object 70 (illustrated in FIG. 10) to which telescope device 50 is fixed, and can release the lock to allow main mirror tilt holder 2 to be moved.

Main mirror tilt holder 2 is rotated (an inclination angle is changed) around the X axis and the Y axis at a time of observation using telescope device 50 to scan the orientation direction of main mirror 1. In main mirror tilt holder 2, a driven object that is a target to be made rotatable around the two rotation axes is main mirror 1. Main mirror tilt holder 2 includes three frames roughly divided. The three frames are an X axis member 4, a Y axis member 5, and a fixed member 6. Main mirror tilt holder 2 includes an X bearing portion 7 and a Y bearing portion 8. X axis member 4 holds main mirror 1. Y axis member 5 holds X axis member 4 so as to be rotatable around the X axis. Fixed member 6 holds Y axis member 5 so as to be rotatable around the Y axis. Fixed member 6 is fixed to an artificial satellite. The artificial satellite is structural object 70 to which telescope device 50 is fixed.

X bearing portion 7 is provided between X axis member 4 and Y axis member 5. X bearing portion 7 enables X axis member 4 to be rotated with respect to Y axis member 5. Y bearing portion K is provided between Y axis member 5 and fixed member 6. Y bearing portion 8 enables Y axis member 5 to be rotated with respect to fixed member 6. X bearing portion 7 and Y bearing portion 8 have a similar structure, and both ends of the rotation axis are held by members provided with a hole for holding the rotation axis via a bearing. Y axis member 5 is connected to X bearing portion 7 and Y bearing portion 8. Therefore, Y axis member 5 holds X axis member 4 and main mirror 1, and enables X axis member 4 and main mirror 1 to be rotated around the X axis and the Y axis with respect to fixed member 6.

X axis member 4 is rotatable with two rotational degrees of freedom with respect to fixed member 6. X axis member 4 and main mirror 1 are rotatable with two rotational degrees of freedom with an intersection point of the X axis and the Y axis, which exist on the same plane, as a center of rotation. A structure such as main mirror tilt holder 2, in which a member holding a driven object has two rotational degrees of freedom with respect to a fixed member and two rotation axes are orthogonal to each other on the same plane, is called a gimbal mechanism. The driven object of main mirror tilt holder 2 is main mirror 1. The X axis is a first rotation axis. The Y axis is a second rotation axis that exists on the plane on which the first rotation axis exists and is orthogonal to the first rotation axis.

X axis member 4 is a first holder that holds a driven object. Y axis member 5 is a second holder that holds X axis member 4 so as to be rotatable around the X axis. Fixed member 6 holds Y axis member 5 so as to be rotatable around the Y axis.

Main mirror tilt holder 2 is symmetrical with respect to the XZ plane. Main mirror tilt holder 2 is symmetrical with respect to a YZ plane. Therefore, X axis member 4, Y axis member 5, and fixed member 6 are also symmetrical with respect to the XZ plane and symmetrical with respect to the YZ plane. A direction parallel to the Z axis is referred to as a vertical direction. In X axis member 4, Y axis member 5, and fixed member 6, a side where main mirror 1 exists in the vertical direction is referred to as main mirror side. The main mirror side is a side where main mirror 1, which is a driven object of main mirror tilt holder 2, exists. The main mirror side is also referred to as driven object side. In main mirror 1, X axis member 4, and Y axis member 5, a side where fixed member 6 exists is referred to as fixed member side. In the vertical direction, X axis member 4 and Y axis member 5 exist on the main mirror side of fixed member 6. The ends on the main mirror side of X axis member 4, Y axis member 5, and fixed member 6 are in approximately the same position in the vertical direction.

X axis member 4 includes a main mirror holder 4A and two X bearing holders 4B. Main mirror holder 4A is a disk-shaped member that holds main mirror 1. X bearing holder 4B is a member provided with a through hole having a circular cross section. Two X bearing holders 4B are provided at positions where the X axis passes in a periphery of main mirror holder 4A. X bearing holder 4B is provided perpendicularly to a side surface of main mirror holder 4A.

Y axis member 5 is an octagonal cylinder having a substantially octagonal outer shape when viewed from the vertical direction and having a height lower than a length of a side. The octagon of the outer shape of Y axis member 5 has a shape in which four long sides and four short sides are alternately arranged. The two opposing short sides are parallel to the X axis. The other two opposing short sides are parallel to the Y axis. A side surface corresponding to the four short sides of Y axis member 5 is provided with a through hole having a circular cross section at a center position of the side surface. Two side surfaces corresponding to the two short sides parallel to the Y axis of Y axis member 5 are referred to as X bearing holder 5A. Two side surfaces corresponding to the two short sides parallel to the X axis are referred to as Y bearing holder 5B. A side surface corresponding to the four long sides of Y axis member 5 is referred to as frame structure 5C.

Fixed member 6 includes a structural object fixed portion 6A and two Y bearing holders 6B. Structural object fixed portion 6A is a substantially flat plate-shaped member having a substantially octagonal outer shape. Structural object fixed portion 6A is fixed to structural object 70. Structural object fixed portion 6A is provided with a circular through hole at a center. The through hole provided in structural object fixed portion 6A is provided such that a central axis of the through hole coincides with the Z axis. Y bearing holder 68 is a member provided with a through hole having a circular cross section. Two Y bearing holders 68 are provided at positions where they can hold the Y axis in the peripheral portion of structural object fixed portion 6A. Y bearing holder 6B is provided perpendicularly to structural object fixed portion 6A.

The through holes provided in X bearing holder 4B, X bearing holder 5A, Y bearing holder 5B, and Y bearing holder 6B are all provided in parallel to an XY plane, and the diameters of the through holes are all the same. X axis member 4 is disposed with respect to Y axis member 5 such that X bearing holder 48 is adjacent to X bearing holder 5A. Here, central axes of the through holes of X bearing holder 4B and X bearing holder 5A coincide with each other. X bearing portion 7 is provided in the through holes of X bearing holder 4B and X bearing holder 5A, Y axis member 5 is disposed with respect to fixed member 6 such that Y bearing holder 5B is adjacent to Y bearing holder 68. Here, central axes of the through holes of Y bearing holder 5B and Y bearing holder 6B coincide with each other. Y bearing portion 8 is provided in the through holes of Y bearing holder 5B and Y bearing holder 68. This configuration allows X axis member 4 to be rotated around the X axis and the Y axis.

As illustrated in FIG. 8, four voice coil motors 9 are provided on a surface on the main mirror side of fixed member 6. Voice coil motors 9 exist between fixed member 6 and X axis member 4. Voice coil motor 9 is a linear motion motor. When voice coil motor 9 is operated, a distance between fixed member 6 and X axis member 4 at a portion where voice coil motor 9 is installed is changed.

Four voice coil motors 9 are provided two by two on two straight lines forming an angle of 45 degrees with respect to the X axis and the Y axis on the XY plane. The distances between four voice coil motors 9 and the intersection point of the X axis and the Y axis are all the same. When viewed from the vertical direction, four voice coil motors 9 are arranged so as to be orthogonal to a straight line connecting installation positions of the voice coil motors 9 and the intersection point of the X axis and the Y axis.

By controlling each of four voice coil motors 9 to have a specified interval, main mirror 1 can be directed in a direction of a specified angle (Ox, Oy) with respect to fixed member 6.

When the satellite mounted with telescope device 50 is launched into orbit, a severe impulsion is applied to telescope device 50. Main mirror 1 is supported by fixed member 6 with four bearings interposed therebetween. In an unlocked state, there is concern that main mirror 1, X axis member 4, and Y axis member 5 may be moved greatly and be broken at the time of launch. Locking device 3 of the present disclosure locks main mirror tilt holder 2 with high rigidity so as not to be moved at the time of launch. After the satellite reaches the orbit, main mirror tilt holder 2 is released to allow main mirror 1 to be driven so that observation by telescope device 50 can be performed.

As illustrated in FIG. 5, locking device 3 is provided at a position on a structure side through which an optical axis (Z axis) of main mirror 1 passes. The main part of locking device 3 is disposed between X axis member 4 and fixed member 6. Locking device 3 fixes X axis member 4 to fixed member 6.

In locking device 3, X axis member 4 is sandwiched between members disposed on the main mirror side and the fixed member side. Accordingly, locking device 3 locks X axis member 4 so as not to be moved with respect to fixed member 6. When the artificial satellite mounted with telescope device 50 is launched from the earth, locking device 3 is locked so that main mirror tilt holder 2 is not moved to prevent members such as main mirror 1 from being damaged. When the artificial satellite begins to orbit the earth in space on a predetermined orbit, locking device 3 puts main mirror tilt holder 2 into a movable state. Locking device 3 locks X axis member 4 so as not to be moved with respect to fixed member 6, or makes X axis member 4 movable with respect to fixed member 6.

Figure 17:
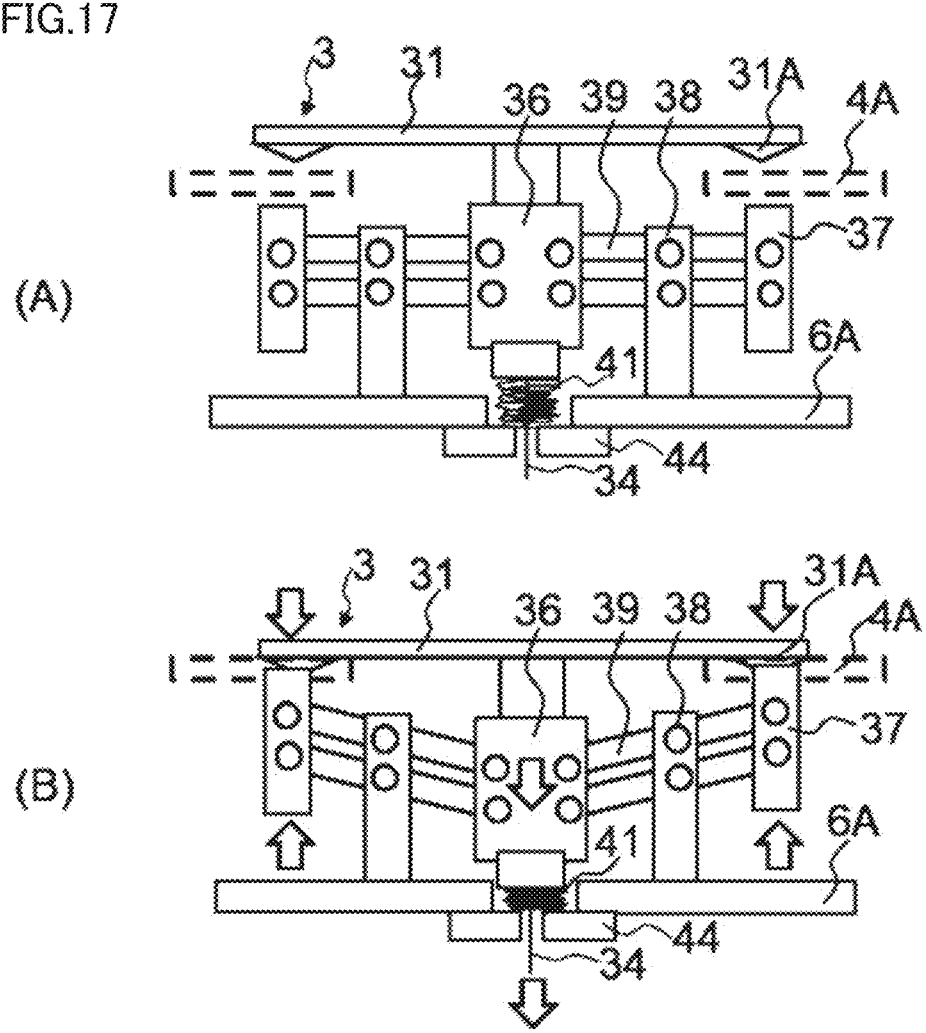
FIG. 17 is a diagram for describing an operation principle of the locking device according to the first embodiment.
Figure 18:
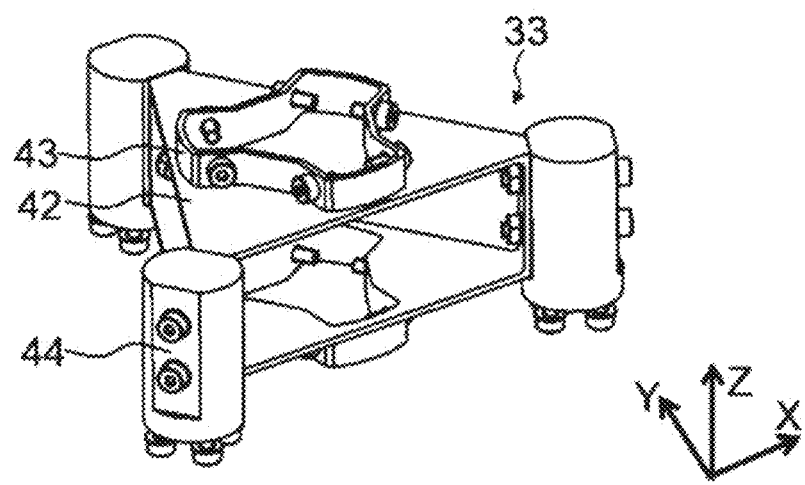
FIG. 18 is a perspective view of the guide plate spring included in the locking device according to the first embodiment.
Figure 19:
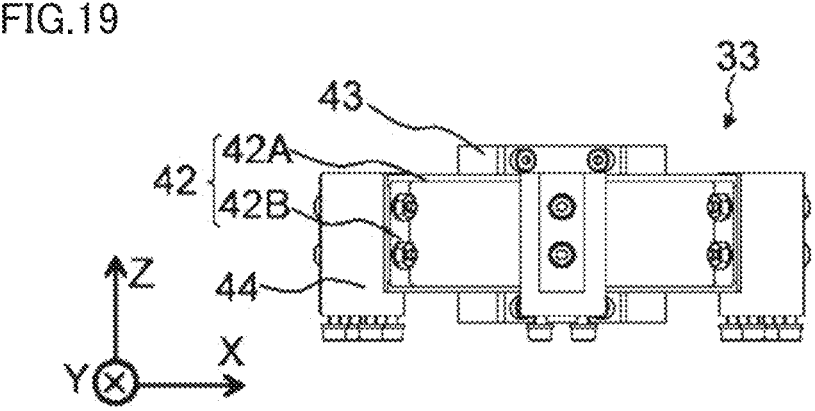
FIG. 19 is a front view of the guide plate spring included in the locking device according to the first embodiment.
Figure 20:
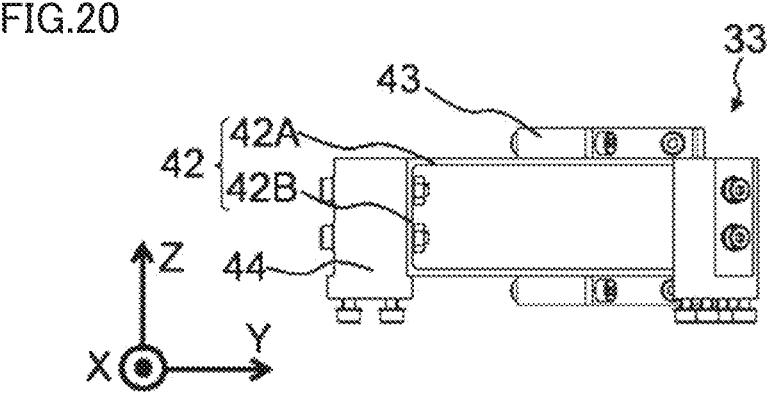
FIG. 20 is a right side view of the guide plate spring included in the locking device according to the first embodiment.
Figure 21:
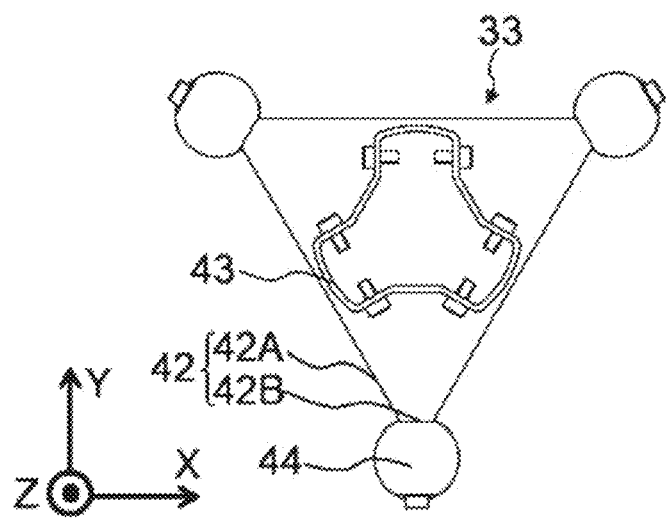
FIG. 21 is a plan view of the guide plate spring included in the locking device according to the first embodiment.
Figure 22:
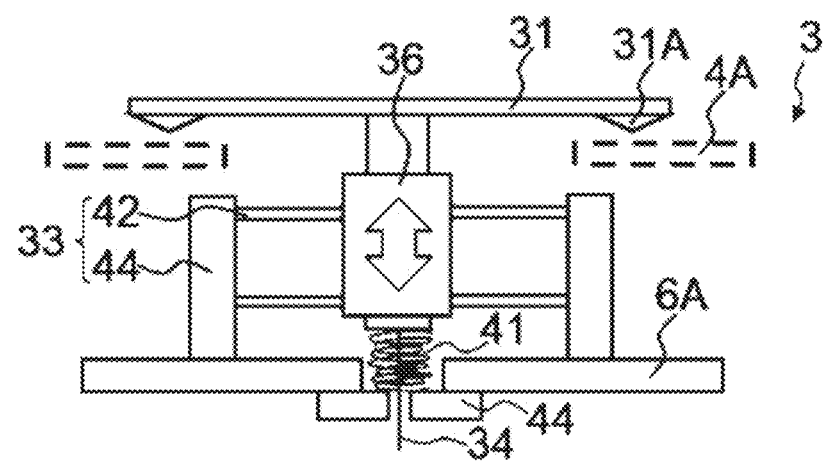
FIG. 22 is a diagram for describing an operation principle of the guide plate spring included in the locking device according to the first embodiment.

The structure of locking device 3 is described with reference to FIGS. 9 to 22. FIGS. 9 to 12 are a perspective view, a front view, a right side view, and a plan view of locking device 3 according to the first embodiment. FIGS. 13 to 16 are a perspective view, a front view, a right side view, and a plan view in a state where a guide plate spring of locking device 3. FIG. 17 is a diagram for describing an operation principle of locking device 3. FIG. 17(A) illustrates a state in which locking device 3 is not locked. In FIG. 17(A), a locking force is not applied to main mirror holder 4A. FIG. 17(B) illustrates a state in which locking device 3 is locked. FIG. 17(B) illustrates forces acting on locking device 3 and main mirror holder 4A. FIGS. 18 to 21 are a perspective view, a front view, a right side view, and a plan view of the guide plate spring included in locking device 3 is removed. FIG. 22 is a diagram for describing an operation principle of the guide plate spring.

Locking device 3 is disposed only on the fixed member side of main mirror 1. Locking device 3, roughly divided, includes main mirror side presser 31, a link mechanism 32, a guide plate spring 33, a wire 34, and a wire fixer 35 (illustrated in FIG. 10). Main mirror side presser 31 exists between X axis member 4 and main mirror 1. Parts of locking device 3 other than main mirror side presser 31 exist on the fixed member side with respect to X axis member 4.

Main mirror side presser 31 is a member that presses X axis member 4 from the main mirror side. Main mirror side presser 31 is a plate member having a triangular shape with rounded corners. Link mechanism 32 is a mechanism that generates a force pressing X axis member 4 from the fixed member side. Link mechanism 32 has a Y shape when viewed from the vertical direction. Guide plate spring 33 is a member that restricts link mechanism 32 to be moved only in a Z axis direction. Guide plate spring 33 has a triangular shape with rounded corners when viewed from the vertical direction. The triangular shape of guide plate spring 33 is upside down in the drawing from the triangular shape of main mirror side presser 31, and has a size slightly smaller than a size of main mirror side presser 31.

Wire 34 and wire fixer 35 switch whether locking device 3 locks or not. One end of wire 34 is connected to link mechanism 32. The other end of wire 34 is fixed at or released from wire fixer 35. When the other end of wire 34 is fixed at wire fixer 35, locking device 3 is locked. When the other end of wire 34 is released from wire fixer 35, locking device 3 is not locked.

Link mechanism 32 includes a central driven portion 36, a fixed member side presser 37, a support 38, a link 39, a structural object side member 40, and a return spring 41. Central driven portion 36 has a portion passing through a through hole provided at a center of X axis member 4. Central driven portion 36 is connected to main mirror side presser 31. One end of wire 34 is connected to central driven portion 36. Central driven portion 36 is a force transmitter that converts a force pulled toward the fixed member side by wire 34 to a pressing force with which main mirror side presser 31 presses X axis member 4 from the main mirror side, and transmits the pressing force to the driven object side presser. Fixed member side presser 37 is a member that presses X axis member 4 from the fixed member side. Central driven portion 36. Fixed member side presser 37, support 38, and link 39 operate like a lever with support 38 as a fulcrum. Link 39 is a lever, central driven portion 36 is a point of force of the lever, support 38 is a fulcrum, and fixed member side presser 37 is a point of action.

In main mirror tilt holder 2 in a released state illustrated in FIG. 18(A), when central driven portion 36 is pulled and moved to the fixed member side, link 39 causes fixed member side presser 37 to be moved to the main mirror side. Link mechanism 32 changes a tensile force, which is a force with which central driven portion 36 is pulled toward the fixed member side, into a force with which fixed member side presser 37 presses X axis member 4 from the fixed member side. As a result, main mirror tilt holder 2 is changed to a locked state illustrated in FIG. 18(B). In the locked state, X axis member 4 is sandwiched firmly by main mirror side presser 31 and fixed member side presser 37 from both sides, and X axis member 4 is not moved with respect to fixed member 6.

Structural object side member 40 is a member fixed to a surface on the structural object side of structural object fixed portion 6A of fixed member 6. Structural object side member 40 is fixed to structural object fixed portion 6A around the through hole provided at the center of structural object fixed portion 6A. Structural object side member 40 has a through hole through which wire 34 passes in the center. Return spring 41 exists between structural object side member 40 and central driven portion 36. Wire 34 passes through an interior of return spring 41. When the other end of wire 34 is released, central driven portion 36 is moved to the main mirror side by return spring 41. When central driven portion 36 is moved to the main mirror side, fixed member side presser 37 connected to central driven portion 36 by link 39 is moved to the fixed member side. In this way, main mirror tilt holder 2 is changed to the released state illustrated in FIG. 18(A). In the released state. X axis member 4 is not restrained by main mirror side presser 31 and fixed member side presser 37. Since structural object side member 40, which is fixed to fixed member 6, can be considered as a part of fixed member 6. It can be considered that return spring 41 is provided between fixed member 6 and central driven portion 36.

In locking device 3, main mirror side presser 31 is disposed on the upper side of X axis member 4 having two rotational degrees of freedom, and link mechanism 32 is disposed on the lower side of X axis member 4, and X axis member 4 is sandwiched from above and below and locked. In locking device 3, X axis member 4 is sandwiched from above and below by three points of tips of three projections 31A provided on a lower surface of main mirror side presser 31 and an upper surface of fixed member side pressers 37 disposed at the positions corresponding to projections 31A, respectively. The upper surface of fixed member side presser 37 and the lower surface of X axis member 4 are flat surfaces. Since X axis member 4 is locked at three points, X axis member 4 is restrained with high rigidity in all directions.

One end of wire 34 is connected to central driven portion 36. Central driven portion 36 is connected to main mirror side presser 31 by link 39. Therefore, by pulling wire 34 toward the fixed member side, a force with which main mirror side presser 31 presses X axis member 4 from the main mirror side is generated. Link mechanism 32 is a mechanism that converts a force pulling wire 34 into a force pushing X axis member 4 from the fixed member side. Wire fixer 35 is a member that fixes the other end of wire 34 at a predetermined position. Wire fixer 35 is a device that switches whether locking device 3 locks or not. When wire fixer 35 fixes the other end of wire 34, locking device 3 is in a state of being locked (locked state). When wire fixer 35 does not fix the other end of wire 34, locking device 3 is in an unlocked state (released state). In the released state, X axis member 4 is movable with respect to fixed member 6. X axis member 4 is movable with respect to fixed member 6, which means that main mirror tilt holder 2 is movable with respect to structural object 70.

Return spring 41 is disposed such that a part of return spring 41 is in the through hole provided in structural object fixed portion 6A. Return spring 41 exists between structural object side member 40 and central driven portion 36. Wire 34 passes through return spring 41. When the other end of wire 34 is fixed at wire fixer 35, return spring 41 is compressed. When the other end of wire 34 is released from wire fixer 35, return spring 41 returns to a length before being compressed and moves central driven portion 36 to a position farther from fixed member 6.

Return spring 41 is an elastic body provided between central driven portion 36 and fixed member 6 and compressed when X axis member 4 is locked so as not to be moved with respect to fixed member 6. Main mirror side presser 31 and fixed member side presser 37 may be moved to positions away from X axis member 4 in the released state by a mechanism different from return spring 41.

Link mechanism 32 includes one central driven portion 36, three sets of fixed member side presser 37, support 38, and link 39. Three fixed member side pressers 37 are disposed at positions of the apexes of an equilateral triangle when viewed from the vertical direction. Main mirror side presser 31 has a substantially triangular shape when viewed from the vertical direction. Near the apexes of the substantially triangular shape of main mirror side presser 31, there are three fixed member side pressers 37 on a surface on the fixed member side of X axis member 4. Therefore, X axis member 4 is sandwiched firmly by three fixed member side pressers 37 and one main mirror side presser 31 from both sides.

Figure 10:
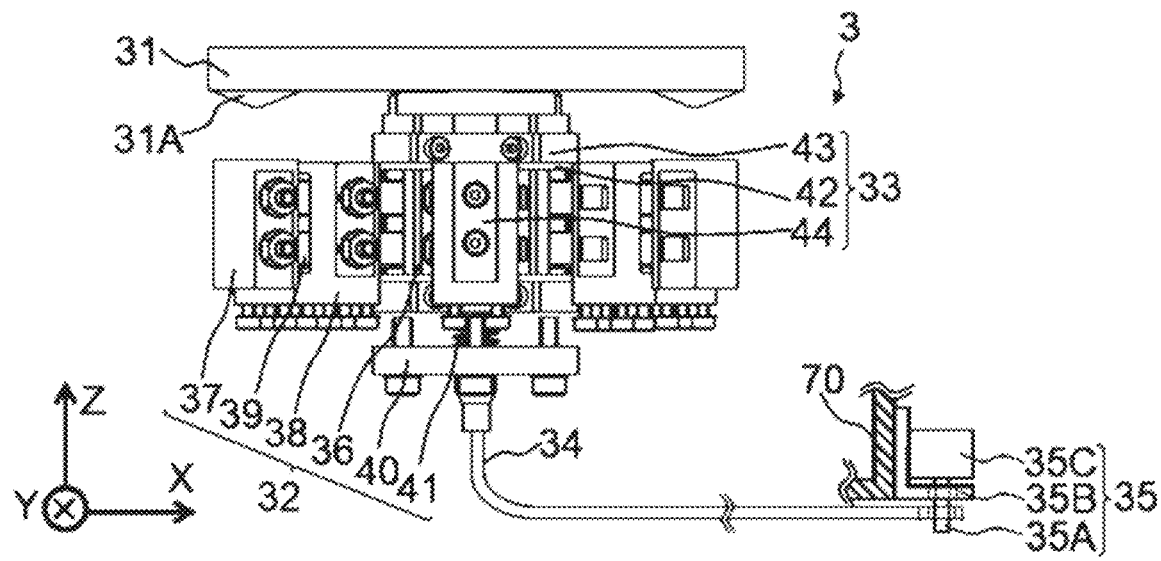
FIG. 10 is a front view of the locking device according to the first embodiment.
Figure 11:
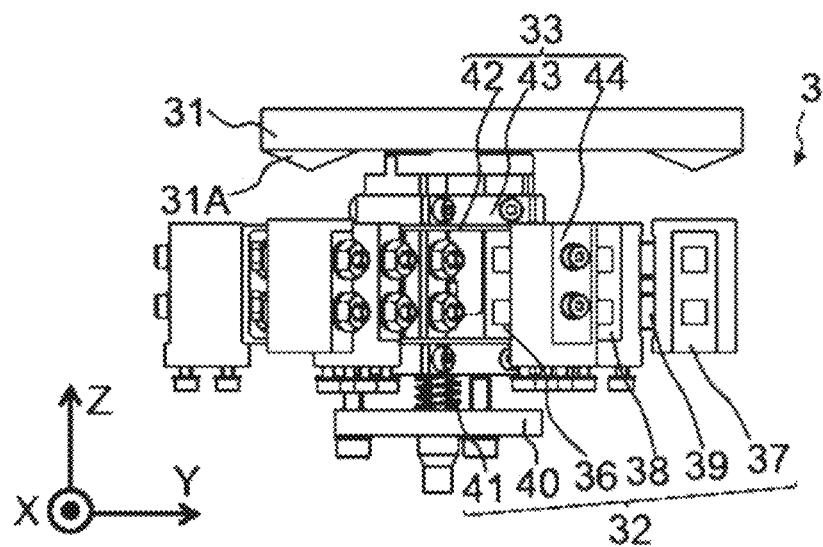
FIG. 11 is a right side view of the locking device according to the first embodiment.
Figure 12:
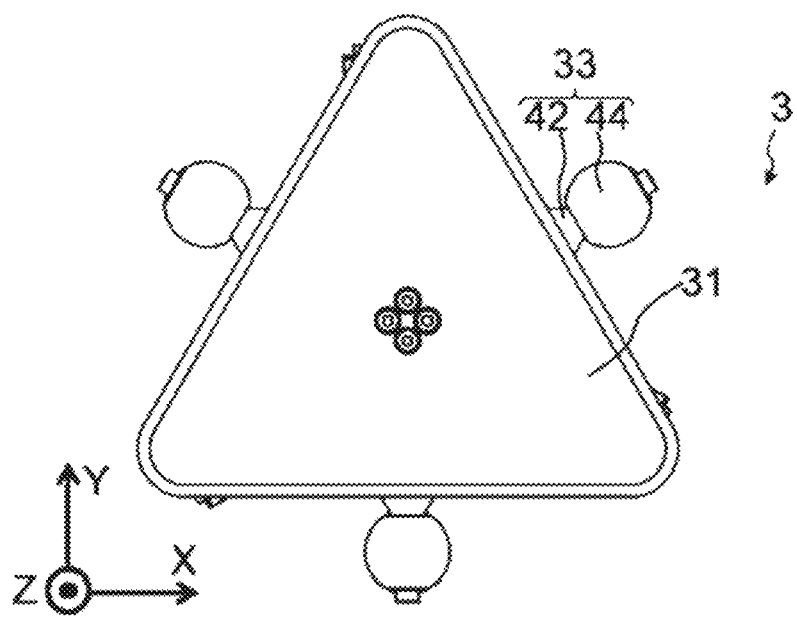
FIG. 12 is a plan view of the locking device according to the first embodiment.
Figure 13:
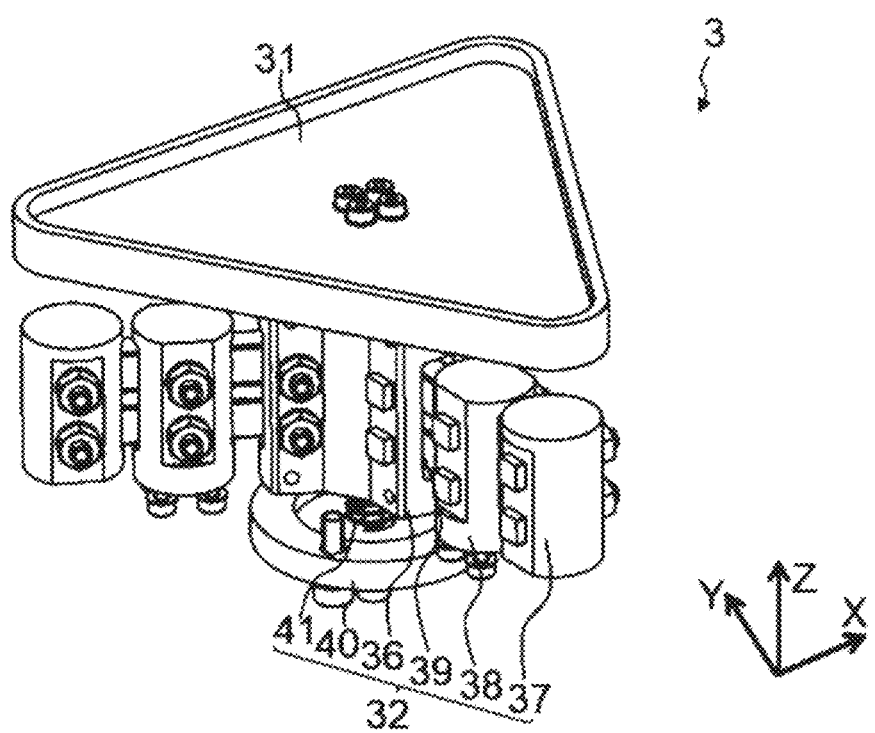
FIG. 13 is a perspective view of the locking device according to the first embodiment in a state where a guide plate spring is removed.
Figure 14:
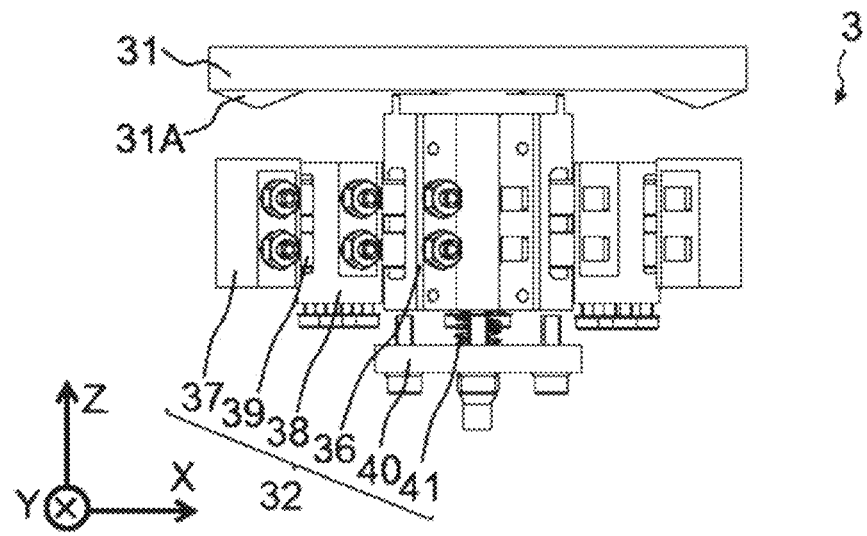
FIG. 14 is a front view of the locking device according to the first embodiment in a state where the guide plate spring is removed.
Figure 15:
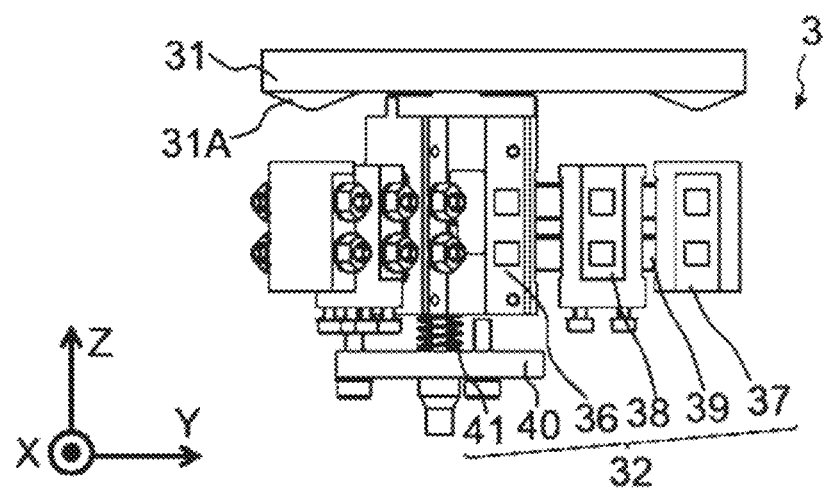
FIG. 15 is a right side view of the locking device according to the first embodiment in a state where the guide plate spring is removed.
Figure 16:
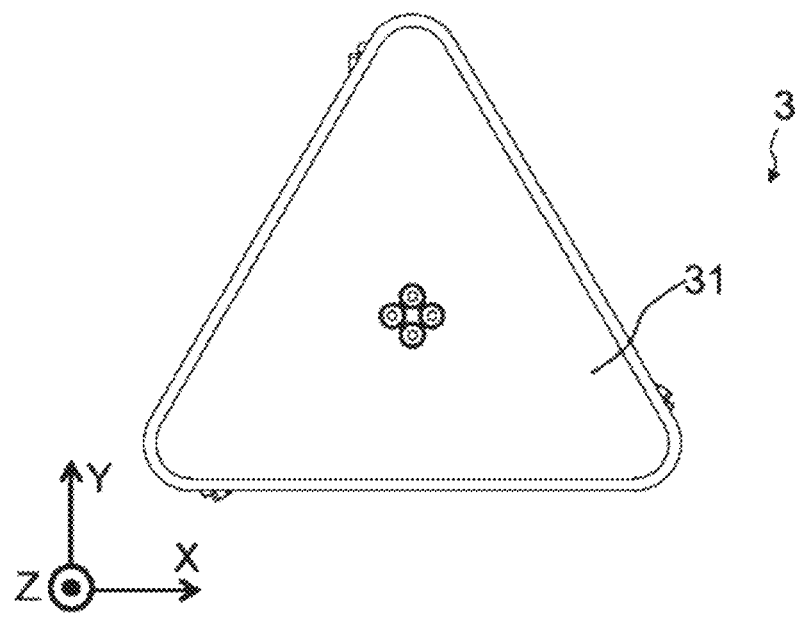
FIG. 16 is a plan view of the locking device according to the first embodiment in a state where the guide plate spring is removed.

As illustrated in FIG. 10, conical projections 31A are provided on a surface on the fixed member side of main mirror side presser 31 near the apexes of the substantially triangular shape of main mirror side presser 31. The position where each of projections 31A is provided is a position corresponding to fixed member side presser 37 on the XY plane. As illustrated in FIG. 7, a depression 4C having a conical side surface at a position corresponding to projection 31A is provided on the surface on the main mirror side of X axis member 4. In the locked state in which X axis member 4 is sandwiched between main mirror side presser 31 and fixed member side presser 37, projection 31A enters and is held in depression 4C. Therefore, a contact position of main mirror side presser 31 in the locked state is not deviated in the XY plane. Projection 31A and depression 4C physically prevent rotation and slippage from occurring in locking device 3. Projection 31A may have a frustoconical shape or another shape. Depression 4C' is only required to have a shape to be able to accommodate projection 31A. Projection 31A and depression 4C desirably have shapes in which no gap is generated therebetween.

Depression 4C is a recess provided at a position where main mirror side presser 31 cones into contact the surface on the main mirror side of X axis member 4. Projection 31A is a protrusion that enters the recess. Projection 31A is provided on the surface on the fixed member side of main mirror side presser 31. The surface on the fixed member side of main mirror side presser 31 is a surface on a side adjacent to main mirror holder 4A of X axis member 4. In the locking device, the recess is not required to be provided on the surface on the main mirror side of X axis member 4, and the protrusion is not required to be provided on the side where X axis member 4 exists of main mirror side presser 31.

Central driven portion 36 is shared by three sets of support 38, fixed member side presser 37, and link 39. Central driven portion 36 is disposed at a position of a center of gravity of the equilateral triangle formed by fixed member side pressers 37. The position where central driven portion 36 is disposed is also a position through which the Z axis passes. Central driven portion 36, support 38, and fixed member side presser 37 extend parallel to the Z axis. Central driven portion 36, support 38, and fixed member side presser 37 exist in a straight line in the XY plane such that support 38 exists between central driven portion 36 and fixed member side presser 37. Support 38 is fixed to fixed member 6. Link 39 is connected to each of central driven portion 36, support 38, and fixed member side presser 37 rotatably. When central driven portion 36 is moved in the Z axis direction, support 38 operates as a fulcrum, link 39 operates as a lever, and fixed member side presser 37 is moved to a side opposite to central driven portion 36 in the Z axis direction. Two links 39 are provided for one set of central driven portion 36, support 38, and fixed member side presser 37. Therefore, when central driven portion 36 and fixed member side presser 37 are moved, the relationship of being parallel each other among central driven portion 36, support 38, and fixed member side presser 37 is maintained.

Central driven portion 36 has a portion penetrating X axis member 4. Central driven portion 36 is connected to main mirror side presser 31. A relative positional relationship between central driven portion 36 and main mirror side presser 31 is fixed. Central driven portion 36 exists between X axis member 4 and fixed member 6. When viewed from the vertical direction, central driven portion 36 has an outline of combined three substantially rectangular shapes having one ends located at the same position and extending in directions forming an angle of 120 degrees with each other. Central driven portion 36 is a columnar body extending in the Z axis direction and having the same outline in the XY plane. Support 38 and fixed member side presser 37 have a substantially cylindrical outer shape.

Main mirror side presser 31 is a driven object side presser that presses X axis member 4 from a side where the driven object exists. Fixed member side presser 37 presses X axis member 4 from a side where fixed member 6 exists. Support 38 is disposed between central driven portion 36 and fixed member side presser 37 when viewed from the vertical direction. Link 39 is connected to each of central driven portion 36, support 38, and fixed member side presser 37 rotatably. Link 39 moves fixed member side presser 37 in a direction approaching X axis member 4 when central driven portion 36 is moved in a direction away from X axis member 4. Link 39 moves fixed member side presser 37 in a direction away from X axis member 4 when central driven portion 36 is moved in a direction approaching X axis member 4.

The structure of wire fixer 35 is described with reference to FIG. 10. Wire fixer 35 includes a wire engagement pin 35A, a fixing structure 35B, and a pin driver 35C. Wire engagement pin 35A is a pin that engages a loop at the other end of wire 34. Wire engagement pin 35A extends from pin driver 35C. Fixing structure 35B is a member to which pin driver 35C is attached and which is provided with a through hole through which wire engagement pin 35A passes. Fixing structure 35B is fixed to structural object 70. Pin driver 35C exists on a side opposite to a side where wire engagement pin 35A engages with wire 34 with respect to fixing structure 35B. Pin driver 35C is attached to a surface of fixing structure 35B provided with the through hole such that wire engagement pin 35A passes through the through hole.

Pin driver 35C changes the length of wire engagement pin 35A. When pin driver 35C shortens the length of wire engagement pin 35A, wire engagement pin 35A is no longer engaged with the other end of wire 34. The length of wire 34 is set to a length at which the other end of wire 34 is engaged with wire engagement pin 35A and locking device 3 is in the locked state. Before launch, the length of wire engagement pin 35A is set to be long, and pin driver 35C is set to an operation mode in which the length of wire engagement pin 35A is maintained to be long. In this state, the other end of wire 34 is engaged with wire engagement pin 35A. In this way, locking device 3 is changed to the locked state.

When unlocking the locked state of locking device 3, a control signal for unlocking is sent to pin driver 35C. When receiving the control signal for unlocking, pin driver 35C shortens the length of wire engagement pin 35A. The other end of wire 34 is no longer engaged with wire engagement pin 35A, and central driven portion 36 and main mirror side presser 31 are moved to positions of the released state by return spring 41. In this way, main mirror tilt holder 2 becomes movable with respect to structural object 70.

Wire 34 and wire fixer 35 are a locking force generator that generates a tensile force that is a force pulling central driven portion 36 toward the fixed member side, and locks X axis member 4, sandwiched between main mirror side presser 31 and fixed member side presser 37, so as not to be moved with respect to fixed member 6.

Guide plate spring 33 is a movement direction restrictor that restricts central driven portion 36 to be moved only in the Z axis direction. Guide plate spring 33 prevents central driven portion 36 from tilting to any direction other than the Z axis direction when main mirror tilt holder 2 is in the released state. Guide plate spring 33 includes one plate spring portion 42, two central driven portion attachment portions 43, and three fixed member attachment portions 44. Central driven portion attachment portion 43 is a member that attaches plate spring portion 42 to central driven portion 36. Fixed member attachment portion 44 is a member that attaches plate spring portion 42 to fixed member 6.

Plate spring portion 42 includes two main surfaces 42A parallel to the XY plane and three side surfaces 42B connecting main surfaces 42A. Main surface 42A has a substantially equilateral triangular outer shape when viewed from the vertical direction. Main surface 42A is a plate spring having appropriate elasticity. A central portion of main surface 42A is provided with a through hole having the same shape as a cross-sectional shape of central driven portion 36 in the XY plane. Each of side surfaces 42B is a member that connects main surface 42A in the Z axis direction near the apex of the equilateral triangle of main surface 42A. Central driven portion attachment portions 43 are provided on the upper side in the drawing of upper main surface 42A and the lower side of lower main surface 42A. Each of central driven portion attachment portions 43 is provided perpendicular to main surface 42A along an edge of the through hole provided in main surface 42A. Central driven portion attachment portion 43 is attached to central driven portion 36. Side surface 42B of plate spring portion 42 is attached to fixed member attachment portion 44. Fixed member attachment portion 44 is attached to fixed member 6 at a lower end in the drawing.

Main surface 42A is a plate spring fixed to central driven portion 36 with a hole through which central driven portion 36 passes. Side surface 42B and fixed member attachment portion 44 are plate spring fixing portion that fixes two main surfaces 42A to fixed member 6.

Central driven portion 36 is connected to fixed member 6 with guide plate spring 33 interposed therebetween. Plate spring portion 42 included in guide plate spring 33 can be deformed in the Z axis direction (vertical direction), but hardly deformed in a direction parallel to the XY plane. As illustrated in FIG. 22, guide plate spring 33 can restrict a movement direction of central driven portion 36 such that central driven portion 36 is moved only in the vertical direction.

The operation is described. In a state where telescope device 50 is mounted on a satellite, locking device 3 is in the locked state. One end of wire 34 is connected to a lower end of central driven portion 36. The other end of wire 34 is looped. The length of wire 34 is set to such a length that main mirror side presser 31 and fixed member side presser 37 can press X axis member 4 with a necessary and sufficient force in a state where the other end is hooked on wire engagement pin 35A of wire fixer 35. Therefore, in a state where the other end of wire 34 is hooked on wire engagement pin 35A, X axis member 4 cannot be moved with respect to fixed member 6. The loop at the other end of wire 34 is hooked on wire engagement pin 35A in a state where tension is applied to wire 34. Pin driver 35C maintains wire engagement pin 35A to be long and keeps wire engagement pin 35A not to be moved against the load from wire 34.

A rocket carrying a satellite, or the like is launched. Locking device 3 locks X axis member 4 so that X axis member 4 cannot be moved with respect to fixed member 6. Main mirror 1 and X axis member 4 are not moved even under a force applied at the time of launch. Main mirror 1 and main mirror tilt holder 2 are launched into space without being damaged. After the satellite begins to move in the predetermined orbit, a control signal is sent to pin driver 35C to shorten wire engagement pin 35A. Pin driver 35C, which receives the control signal, shortens wire engagement pin 35A. The loop at the other end of wire 34 is released from wire engagement pin 35A, and wire 34 becomes movable. The force compressing return spring 41 is no longer present, and return spring 41 returns to its original length. Main mirror side presser 31 is moved upward, and fixed member side presser 37 is moved downward. Main mirror tilt holder 2 can be rotated within a predetermined angle range around the X axis and the Y axis.

Using telescope device 50, observation of an observation target such as a celestial body is started. For the observation, voice coil motor 9 is controlled so that main mirror 1 is scanned so as to direct a designated direction, and telescope device 50 observes the observation target.

When main mirror tilt holder 2 is in the released state, if link mechanism 32 is completely free to be moved, there is concern that link mechanism 32 may be moved in such a way in which link mechanism 32 is inclined with respect to the Z axis. When link mechanism 32 is inclined, there is a possibility that link mechanism 32 and X axis member 4 interfere with each other. When link mechanism 32 and X axis member 4 interfere and come into contact with each other, there is a possibility that either or both of link mechanism 32 and X axis member 4 (including main mirror 1) are damaged. Guide plate spring 33 prevents link mechanism 32 and X axis member 4 from interfering with each other by restricting central driven portion 36 to be moved only in the Z axis direction. By forming plate spring portion 42 into a triangular shape, central driven portion 36 is prevented from twisting and moving around the Z axis, and stress acting between plate spring portion 42 and central driven portion 36 is relieved.

Locking device 3 has a structure simpler than the structure disclosed in PTL 1. Locking device 3 can lock main mirror tilt holder 2 with a necessary and sufficient force against a large load applied at the time of launch so as not to be moved. Locking device 3 will be applied to a telescope device mounted on a solar observation satellite Solar-C.

Main mirror side presser 31 is not required to have a triangular shape, but may have a substantially Y shape that connects the corresponding positions of three fixed member side pressers 37 and a vicinity where the Z axis passes. Main mirror side presser 31 is provided at a position corresponding to fixed member side presser 37 on the surface on the main mirror side of X axis member 4, and may have any shape as long as main mirror side presser 31 can press X axis member 4 from the main mirror side.

Link mechanism 32 may include two sets or four or more sets of fixed member side presser 37, support 38, and link 39. In link mechanism 32, central driven portion 36 is shared by three sets of fixed member side presser 37, support 3K, and link 39. The link mechanism may include three central driven portions 36.

In a case where there is no or very little possibility that the driven object of the gimbal mechanism and the link mechanism interfere with each other, the locking device is not required to include the guide plate spring.

Modifications of the embodiment, omission of some components, and free combinations of modifications and omissions are possible.

REFERENCE SIGNS LIST

50: telescope device, 70: structural object, 1: main mirror (driven object), 2: main mirror tilt holder (gimbal mechanism), 3: locking device, 4: X axis member (first holder), 4A: main mirror holder, 4B: X bearing holder, 4C: depression (recess), 5: Y axis member (second bolder), 5A: X bearing holder, 5B: Y bearing holder, 5C: frame body structure, 6: fixed member, 6A: structural object fixed portion, 6B: Y bearing holder, 7: X bearing portion, 8: Y bearing portion, 9: voice coil motor, 31: main mirror side presser (driven object side presser), 31A: projection (protrusion), 32: link mechanism, 33: guide plate spring, 34: wire, 35: wire fixer, 35A: wire engagement pin, 35B: fixing structure, 35C: pin driver, 36: central driven portion (force transmitter), 37: fixed member side presser, 38: support, 39: link, 40: structural object side member, 41: return spring (elastic body), 42: plate spring portion, 42A: main surface, 42B: side surface, 43: central driven portion attachment portion, 44: fixed member attachment portion, X: X axis (first rotation axis), Y: Y axis (second rotation axis), Z: Z axis.

The invention claimed is:

1. A locking device in a gimbal mechanism including a first holder to hold a driven object, a second holder to hold the first holder so as to be rotatable around a first rotation axis, and a fixed member to hold the second holder so as to be rotatable around a second rotation axis that exists on a plane on which the first rotation axis exists and is orthogonal to the first rotation axis, the locking device locking the first holder so as not to be moved with respect to the fixed member or allowing the first holder to be moved with respect to the fixed member, the locking device comprising:
a driven object side presser to press the first holder from a side where the driven object exists;

a force transmitter having a portion penetrating the first holder and to convert a tensile force pulled toward a side where the fixed member exists to a pressing force with which the driven object side presser presses the first holder, and to transmit the pressing force to the driven object side presser;

a fixed member side presser to press the first holder from the side where the fixed member exists;

a support disposed between the force transmitter and the fixed member side presser when viewed from a vertical direction that is a direction perpendicular to the first rotation axis and the second rotation axis, the support being fixed to the fixed member;

a link connected to each of the force transmitter rotatably, the support, and the fixed member side presser, to move the fixed member side presser in a direction approaching the first holder when the force transmitter is moved in a direction away from the first holder, and to move the fixed member side presser in a direction away from the first holder when the force transmitter is moved in a direction approaching the first holder; and a locking force generator to generate the tensile force, and to lock the first holder, sandwiched between the driven object side presser and the fixed member side presser, so as not to be moved with respect to the fixed member.

2. The locking device according to claim 1, wherein a protrusion is provided on a surface of the driven object side presser on a side where the first holder exists so that the protrusion enters a recess provided on a surface of the first holder at a position to be in contact with the driven object side presser.

3. The locking device according to claim 2, wherein the protrusion is conical or frustoconical.

4. The locking device according to claim 1, further comprising:
one force transmitter which is the force transmitter; and
three sets of the fixed member side presser, the support, and the link.

5. The locking device according to claim 4, wherein each of the fixed member side pressers is disposed at a position of an apex of an equilateral triangle with the force transmitter as a center of gravity when viewed from the vertical direction.

6. The locking device according to claim 1, further comprising a movement direction restrictor to restrict the force transmitter to be moved in the vertical direction.

7. The locking device according to claim 6, wherein the movement direction restrictor includes two plate springs having a hole through which the force transmitter passes and fixed to the force transmitter, and a plate spring fixing portion to fix the two plate springs to the fixed member.

8. The locking device according to claim 1, further comprising an elastic body provided between the force transmitter and the fixed member and compressed when the first holder is locked so as not to be moved with respect to the fixed member.

9. The locking device according to claim 1, wherein the locking force generator includes a wire having one end connected to the force transmitter, and a wire fixer to apply the tensile force to the wire and to fix another end of the wire at a predetermined position.

10. A gimbal mechanism comprising:
the first holder;
the second holder;
the fixed member; and
the locking device according to claim 1.

11. A gimbal mechanism comprising:
a first holder to hold a driven object;
a second holder to hold the first holder so as to be rotatable around a first rotation axis;
a fixed member to hold the second holder so as to be rotatable around a second rotation axis that exists on a plane on which the first rotation axis exists and is orthogonal to the first rotation axis; and
a locking device to lock the first holder so as not to be moved with respect to the fixed member or to allow the first holder to be moved with respect to the fixed member, wherein
the locking device includes
a driven object side presser to press the first holder from a side where the driven object exists,
a force transmitter having a portion penetrating the first holder and to convert a tensile force pulled toward a side where the fixed member exists to a pressing force with which the driven object side presser presses the first holder, and to transmit the pressing force to the driven object side presser,
a fixed member side presser to press the first holder from the side where the fixed member exists,
a support disposed between the force transmitter and the fixed member side presser when viewed from a vertical direction that is a direction perpendicular to the first rotation axis and the second rotation axis, the support being fixed to the fixed member,
a link connected to each of the force transmitter rotatably, the support, and the fixed member side presser, to move the fixed member side presser in a direction approaching the first holder when the force transmitter is moved in a direction away from the first holder, and to move the fixed member side presser in a direction away from the first holder when the force transmitter is moved in a direction approaching the first holder, and
a locking force generator to generate the tensile force, and to lock the first holder, sandwiched between the driven object side presser and the fixed member side presser, so as not to be moved with respect to the fixed member.

12. The gimbal mechanism according to claim 11, wherein
the first holder is provided with a recess on a surface on the side where the driven object exists at a position where the driven object side presser comes into contact, and
the driven object side presser is provided with a protrusion on a side where the first holder exists at a position facing the recess on a surface.

13. The gimbal mechanism according to claim 12, wherein the protrusion is conical or frustoconical.

14. The gimbal mechanism according to claim 11, wherein the locking device includes one force transmitter which is the force transmitter and three sets of the fixed member side presser, the support, and the link.

15. The gimbal mechanism according to claim 14, wherein each of the fixed member side pressers is disposed at a position of an apex of an equilateral triangle with the force transmitter as a center of gravity when viewed from the vertical direction in the locking device.

16. The gimbal mechanism according to claim 11, the locking device includes a movement direction restrictor to restrict the force transmitter to be moved in the vertical direction.

17. The gimbal mechanism according to claim 16, wherein the movement direction restrictor includes two plate springs having a hole through which the force transmitter passes and fixed to the force transmitter, and a plate spring fixing portion to fix the two plate springs to the fixed member.

18. The gimbal mechanism according to claim 11, wherein the locking device includes an elastic body provided between the force transmitter and the fixed member and compressed when the first holder is locked so as not to be moved with respect to the fixed member.

19. The gimbal mechanism according to claim 11, wherein the locking force generator includes a wire having one end connected to the force transmitter, and a wire fixer to apply the tensile force to the wire and to fix another end of the wire at a predetermined position.

20. A telescope device comprising:
   a main mirror to reflect light or a radio wave; and
   the gimbal mechanism according to claim 11, using the main mirror as the driven object.

* * * * *